(12) United States Patent
Krebs (10) Patent No.: US 7,409,683 B2
(45) Date of Patent: Aug. 5, 2008

(54) EXECUTING WIZARD DATA USING A METAWIZARD FRAMEWORK

(75) Inventor: Andreas S. Krebs, Karlsruhe (DE)

(73) Assignee: SAP AG, Walldorf (DE)

( * ) Notice: Subject to any disclaimer, the term of this patent is extended or adjusted under 35 U.S.C. 154(b) by 833 days.

(21) Appl. No.: 10/831,020

(22) Filed: Apr. 22, 2004

(65) Prior Publication Data
US 2005/0240900 A1   Oct. 27, 2005

(51) Int. Cl.
G06F 9/44 (2006.01)
(52) U.S. Cl. .................................... 717/162
(58) Field of Classification Search ......... 717/104–110, 717/159–160, 162
See application file for complete search history.

(56) References Cited

U.S. PATENT DOCUMENTS

| | | | |
|---|---|---|---|
| 6,502,234 B1 * | 12/2002 | Gauthier et al. ............. | 717/107 |
| 6,574,791 B1 * | 6/2003 | Gauthier et al. ............. | 717/107 |
| 6,697,819 B2 * | 2/2004 | Boudreau ................ | 707/103 R |
| 6,763,515 B1 * | 7/2004 | Vazquez et al. ............. | 717/109 |
| 6,993,759 B2 * | 1/2006 | Aptus et al. ................. | 717/170 |
| 6,996,800 B2 * | 2/2006 | Lucassen et al. ............ | 717/106 |
| 7,000,218 B2 * | 2/2006 | Gerken ........................ | 717/106 |
| 7,114,146 B2 * | 9/2006 | Zhang et al. ................ | 717/106 |
| 7,188,333 B1 * | 3/2007 | LaMotta et al. ............. | 717/106 |
| 7,197,739 B2 * | 3/2007 | Preston et al. .............. | 717/106 |

OTHER PUBLICATIONS

Chaudhuri et al. "Microsoft Index Tuning Wizard for SQL Server 7.0", Jun. 1998, ACM, SIGMOD Record, vol. 27, Issue 2, pp. 553-554.*
Friedland "Accessing the data warehouse: designing tools to facilitate business understanding" Jan. 1998, ACM, interactions, vol. 5 Ussue, pp. 25-36.*
Liu et al. "A visual tool for building logical data models of websites", Nov. 2002, ACM, WIDM '02, pp. 92-95.*

* cited by examiner

*Primary Examiner*—Wei Y. Zhen
*Assistant Examiner*—Anna Deng (57) ABSTRACT

In one general aspect, a computer program product for executing wizard data using a metawizard is described. The computer program product may be tangibly embodied on a computer-readable medium and include executable code that, when executed, is configured to cause at least one data processing apparatus to execute the metawizard. The metawizard may be configured to execute a portion of a first wizard data in a metawizard, determine a second wizard data in the metawizard remains to be executed, and execute a portion of the second wizard data in the metawizard.

12 Claims, 8 Drawing Sheets

EXECUTING WIZARD DATA USING A METAWIZARD FRAMEWORK

FIELD

The present document relates to the field of software programming, and more particularly to reuse of programming code.

BACKGROUND

Programming computers is a labor-intensive process, requiring available talented workers, computer power for programming and time for an iterative process of code writing, review/debugging, and editing. Computer programs are written for a variety of purposes, often using similar algorithms and code modules for varied and diverse applications. Moreover, different programs can utilize similar user interfaces for example, allowing for user familiarity and potential reuse of code. However, individual programs often require customization at a level such that general aspects of an algorithm may be reused while specific details vary from implementation to implementation.

Figure 1A:
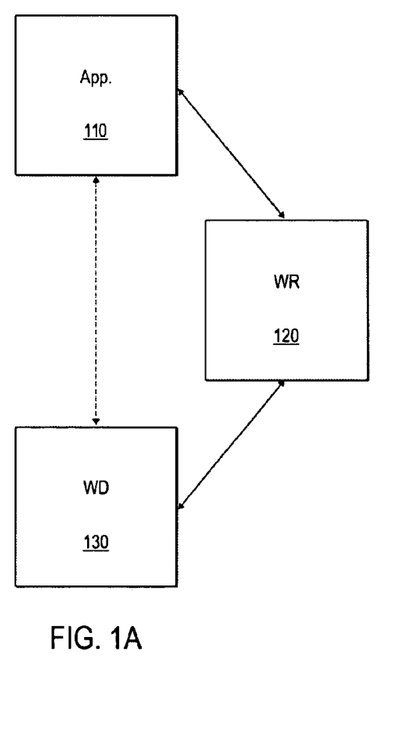
FIG. 1A illustrates an embodiment of a relationship between a first wizard, a wizard renderer, and an application.

In particular, wizards may be used to gather data from users. For example, FIG. 1A illustrates an embodiment of a relationship between a first wizard, a wizard renderer, and an application. The application 110 is linked or coupled to the wizard renderer 120, and may submit a request to the wizard renderer 120. The request may include a specification of what wizard data (the first wizard data 130 for example) to render, and thereby execute the process of the specified wizard data. Wizard renderer 120 may then execute the first wizard data 130, directing it to execute its first or next step until completed, and providing a link to a user interface. Wizard renderer 120 may maintain state for first wizard data 130, for example, and may thus maintain information about what is the next step to execute in first wizard data 130 for example. Wizard renderer 120 may also return the results (data for example) from operation of first wizard data 130 to application 110. Alternatively, application 110 may query objects associated with first wizard data 130 to obtain data accessed, gathered or processed by first wizard 130 data.

Figure 1B:
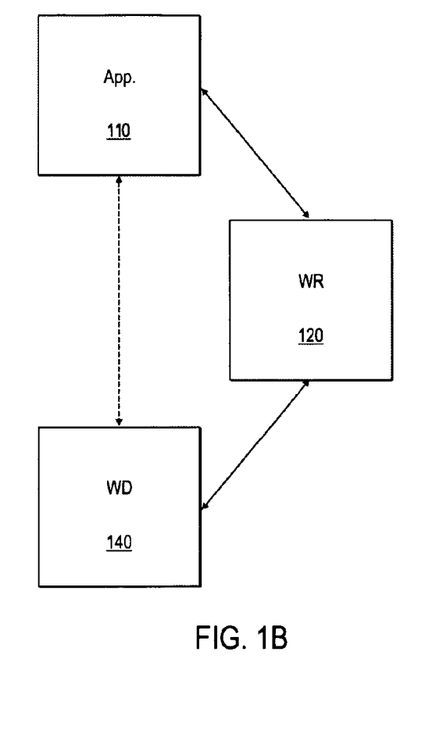
FIG. 1B illustrates an embodiment of a relationship between a second wizard, a wizard renderer, and an application.

Similarly, FIG. 1B illustrates an embodiment of a relationship between a second wizard, a wizard renderer, and an application. Application 110 may request that the wizard renderer 120 operate a second wizard data 140. Wizard renderer 120 may then execute the second wizard data 140, directing it to execute its first or next step until completed, and providing a link to a user interface. Again, wizard renderer 120 may return the results (data for example) from operation of second wizard data 140 to application 110. Similarly, application 110 may query second wizard data 140 to obtain data accessed, gathered or processed by second wizard data 140.

With multiple wizards in existence, it may be useful to reuse these wizards to perform the same functions without requiring reprogramming. Moreover, it may be useful to reuse parts of existing wizards without requiring use or execution of an entire wizard, and without requiring rewriting of the existing wizard to meet the proposed requirements. Essentially, it may be useful to reduce reinvention of the wheel or similar repetition of basic tasks.

SUMMARY

The present invention is described and illustrated in conjunction with systems, apparatuses and methods of varying scope. In addition to the aspects of the present invention described in this summary, further aspects of the invention will become apparent by reference to the drawings and by reading the detailed description that follows. A method and apparatus for a metawizard framework is described.

In one embodiment, the invention is a method. The method includes executing a portion of a first wizard data in a metawizard. Executing the first wizard data includes finding a selected step of the first wizard data. Executing the first wizard data also includes executing the selected step. Executing the first wizard data further includes finding a next selected step of the first wizard data. Executing the first wizard data additionally includes executing the next selected step. Executing the first wizard data also includes repeating the finding a next selected step and executing the next selected step until no selected steps of the first wizard data remain.

The method further includes determining a second wizard data in the metawizard remains to be executed. The method also includes executing a portion of the second wizard data in the metawizard. Executing the second wizard data includes finding a selected step of the second wizard data. Executing the second wizard data further includes executing the selected step. Executing the second wizard data also includes finding a next selected step of the second wizard data. Executing the second wizard data further includes executing the next selected step. Executing the second wizard data also includes repeating the finding a next selected step and executing the next selected step until no selected steps of the second wizard data remain.

In another embodiment, the invention is a method. The method includes executing a portion of a first wizard data in a metawizard. The method also includes determining a second wizard data in the metawizard remains to be executed. The method additionally includes executing a portion of the second wizard data in the metawizard.

In yet another embodiment, the invention is a method. The method includes linking a first wizard data to a metawizard. The method also includes selecting steps of the first wizard data as a portion of the first wizard data to execute. The method further includes linking a second wizard data to the metawizard. The method also includes selecting steps of the second wizard data as a portion of the second wizard data to execute. The method further includes programming control logic to execute the portion of the first wizard data and programming control logic to execute the portion of the second wizard data.

In still another embodiment, the invention is a system. The system includes a processor and a bus coupled to the processor. The system also includes a memory coupled to the bus. Within the system, the processor is to execute a metawizard. The metawizard includes a first wizard data and a second wizard data.

In a further embodiment, the invention is a medium embodying instructions, which, when executed by a processor, cause the processor to perform a method. The method includes executing a portion of a first wizard data in a metawizard. The method also includes determining a second wizard data in the metawizard remains to be executed. The method further includes executing a portion of the second wizard data in the metawizard.

In yet another embodiment, the invention is an apparatus. The apparatus includes means for executing a portion of a first wizard data in a metawizard. The apparatus further includes means for determining a second wizard data in the metawizard remains to be executed. Additionally, the apparatus includes means for executing a portion of the second wizard data in the metawizard.

The present invention is exemplified in the various embodiments described, and is limited in spirit and scope only by the appended claims.

BRIEF DESCRIPTION OF THE DRAWINGS

The present invention is illustrated in various exemplary embodiments and is limited in spirit and scope only by the appended claims.

Like reference symbols in the various drawings indicate like elements or the same element.

DETAILED DESCRIPTION

The present invention is described and illustrated in conjunction with systems, apparatuses and methods of varying scope. In addition to the aspects of the present invention described in this summary, further aspects of the invention will become apparent by reference to the drawings and by reading the detailed description that follows.

Previously developed wizards may be provided as part of a metawizard, allowing for reuse of portions of the wizards without complete recoding. For example, a metawizard may invoke steps from a first wizard and then steps from a second wizard to combine functions of two wizards in one embodiment. Moreover, looping of a previously unlooped wizard or combination of more than two wizards may be accomplished in other embodiments.

In one embodiment, the invention is a method. The method includes executing a portion of a first wizard data in a metawizard. Executing the first wizard data includes finding a selected step of the first wizard data. Executing the first wizard data also includes executing the selected step. Executing the first wizard data further includes finding a next selected step of the first wizard data. Executing the first wizard data additionally includes executing the next selected step. Executing the first wizard data also includes repeating the finding a next selected step and executing the next selected step until no selected steps of the first wizard data remain. The method further includes determining a second wizard data in the metawizard remains to be executed. The method also includes executing a portion of the second wizard data in the metawizard. Executing the second wizard data includes finding a selected step of the second wizard data. Executing the second wizard data further includes executing the selected step. Executing the second wizard data also includes finding a next selected step of the second wizard data. Executing the second wizard data further includes executing the next selected step. Executing the second wizard data also includes repeating the finding a next selected step and executing the next selected step until no selected steps of the second wizard data remain.

In another embodiment, the invention is a method. The method includes executing a portion of a first wizard data in a metawizard. The method also includes determining a second wizard data in the metawizard remains to be executed. The method additionally includes executing a portion of the second wizard data in the metawizard.

In yet another embodiment, the invention is a method. The method includes linking a first wizard data to a metawizard. The method also includes selecting steps of the first wizard data as a portion of the first wizard data to execute. The method further includes linking a second wizard data to the metawizard. The method also includes selecting steps of the second wizard data as a portion of the second wizard data to execute. The method further includes programming control logic to execute the portion of the first wizard data and programming control logic to execute the portion of the second wizard data.

In still another embodiment, the invention is a system. The system includes a processor and a bus coupled to the processor. The system also includes a memory coupled to the bus. Within the system, the processor is to execute a metawizard. The metawizard includes a first wizard data and a second wizard data.

In a further embodiment, the invention is a medium embodying instructions, which, when executed by a processor, cause the processor to perform a method. The method includes executing a portion of a first wizard data in a metawizard. The method also includes determining a second wizard data in the metawizard remains to be executed. The method further includes executing a portion of the second wizard data in the metawizard.

In yet another embodiment, the invention is an apparatus. The apparatus includes means for executing a portion of a first wizard data in a metawizard. The apparatus further includes means for determining a second wizard data in the metawizard remains to be executed. Additionally, the apparatus includes means for executing a portion of the second wizard data in the metawizard.

Figure 2:
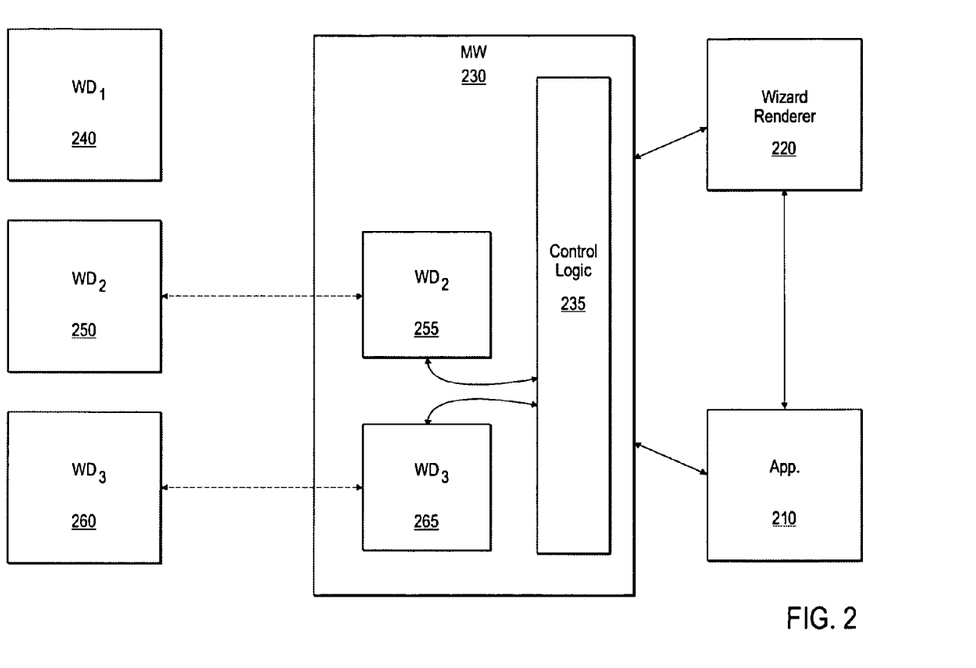
FIG. 2 illustrates an embodiment of a relationship between a set of wizards, a metawizard, a wizard renderer and an application.

FIG. 2 illustrates an embodiment of a relationship between a set of wizards, a metawizard, a wizard renderer and an application. An application may use a metawizard to reuse portions of wizards in new combinations, without requiring a new, rewritten wizard. Application 210 uses wizard renderer 220 to operate wizard data. As illustrated, available wizard data includes wizard data 240, 250 and 260. For example, wizard data 240 may be used to obtain account login information in one embodiment. Wizard data 250 may be used to obtain product selection information in an embodiment. Wizard data 260 may be used to obtain shipping information (such as address and method of shipment for example).

If a new wizard for both product selection and shipping is desired, a metawizard 230 may be produced. Metawizard 230 includes wizard data 255 and wizard data 265, along with control logic 235. In one embodiment, wizard data 255 is an instantiation of wizard data 250, with a subscription or link between the two to ensure that changes to wizard data 250 are reflected in wizard data 255. In an alternate embodiment, wizard data 255 is a link to wizard data 250. Similarly, in some embodiments wizard data 265 is an instantiation of wizard data 260, whereas in other embodiments, wizard data 265 is a link to wizard data 260.

Wizard renderer 220 may operate as an interface between metawizard 230 and application 210. Metawizard 230 may thus be invoked by wizard renderer 220 responsive to a request from application 210. Once invoked, metawizard 230 may use control logic 235 to maintain state information, including a first step and current next step of each wizard data (255, 265), a list of activated steps (steps to be processed) for each wizard data, and environment data (such as variables or data structures for example). Wizard data 255 and wizard data 265 may be invoked responsive to control logic 235, allowing for processing of selected steps from wizard data 255 and 265 with changes to data maintained by metawizard 230 and control logic 235. Moreover, steps of wizard data 255 and 265 may be invoked out of the original order of steps of wizard data 250 and 260, for example.

Thus, to use the examples of a product selection and a shipping selection wizard, the wizards may start with full sets of steps and have subsets used. For example, the product selection wizard 250 may include an introductory step, a set of steps for actually selecting the product, and then a set of steps for recording these choices, and a step for exiting the wizard 250. Similarly, the shipping selection wizard 260 may include an introductor step, a set of steps for selecting shipping method (e.g. express, normal, ground, etc.), a set of steps for storing this information, and an exit step.

Metawizard 230 may invoke the sets of steps for selecting the product and then selecting the shipping methods, and may or may not need the steps for storing the information, depending on whether storage in an external data repository is necessary. In one embodiment, the wizards (255, 265) may already be designed to store data temporarily in an environment data structure which the metawizard 230 may access separately. Alternatively, the wizards (255, 265) may be designed to store data in a repository (such as a database for example), and thus the sets of steps for storage may be advantageously invoked by metawizard 230.

Wizard data, as used in this document, relates to a set of steps and associated objects which make up a wizard. In some instances, what is called a wizard is in fact wizard data, in that it is not a self-contained and self-executing object, but is data which may be used by a wizard renderer to provide a user interface in the form of a wizard. Wizard data may include a set of steps and information thereon. The information includes information about a first step, a next step for each included step, and data which may be operated on by the steps of the wizard data. The wizard data provides this information in a manner that allows a wizard renderer to render the wizard by accessing the first step, next steps, and any data structures which need to be used (such as by queries to the wizard data, for example). The wizard renderer itself may act as an interface between wizard data and a user interface or an application, for example. The wizard renderer may track which step of the wizard data was just executed, and then query the wizard data for a next step corresponding to the step just executed, thereby avoiding a requirement that the wizard data maintain internal state of execution.

A metawizard, as described in this document, relates to a wizard data that includes other wizard data and control logic useful in modifying performance of the original wizard data. The metawizard uses the control logic to provide an interface with a wizard renderer, thereby providing information about a first step and next steps responsive to requests. The control logic further may send requests to included or linked wizard data to determine a first step or next step for the wizard data in question, while maintaining information about what parts of the included or linked wizard data are actually active in operation of the metawizard. Moreover, a metawizard may be included in or linked to another metawizard, allowing for further reuse and customization.

Figure 3:
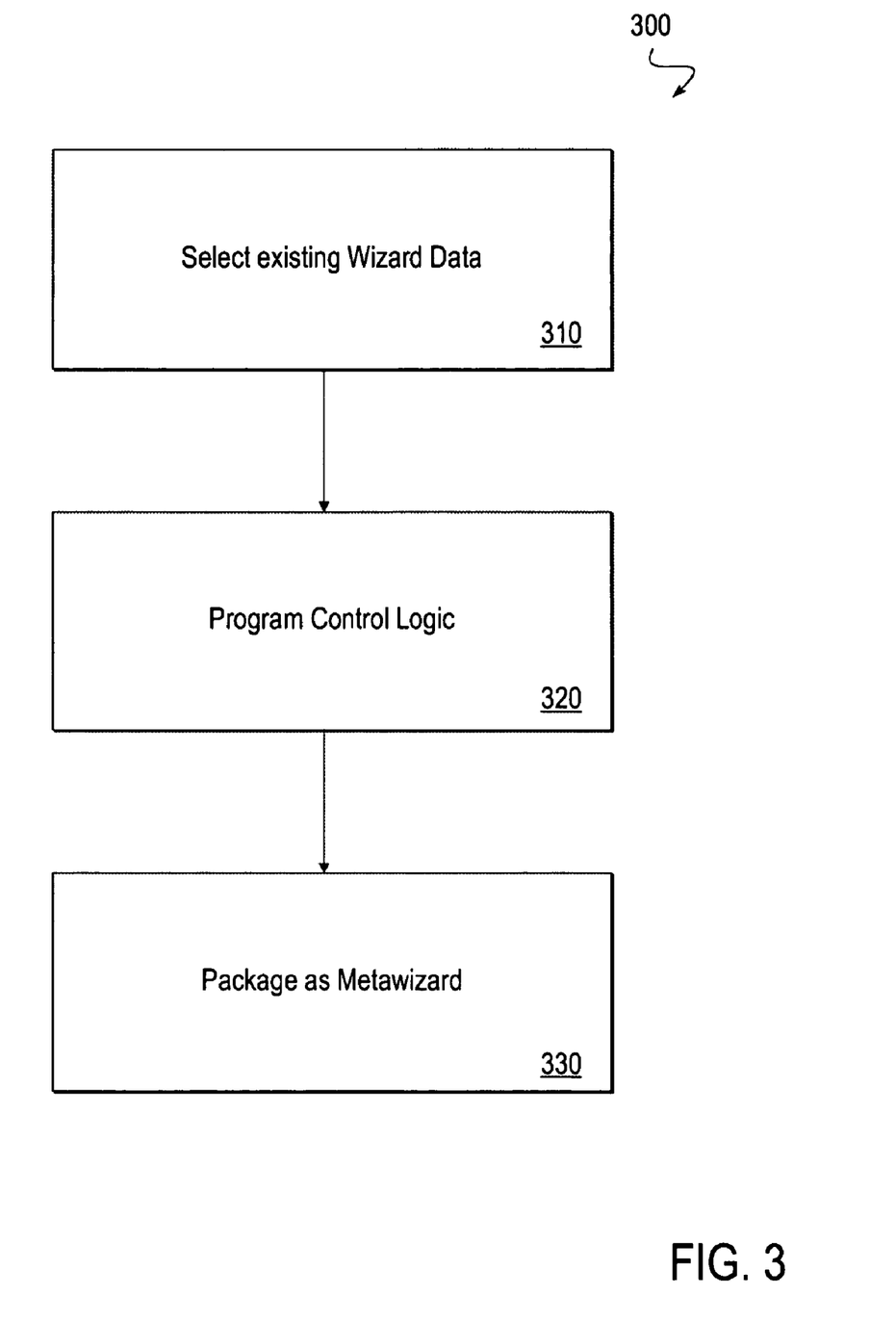
FIG. 3 illustrates an embodiment of a method of forming a metawizard.

Such metawizards may be formed in a variety of ways. FIG. 3 illustrates an embodiment of a method of forming a metawizard. Method 300 includes selecting wizard data, programming related control logic, and packaging the material as a metawizard for further use. Method 300 and other methods may be formed of modules which may be operated or executed in parallel or series, for example, and may be implemented in a variety of ways including as parts of a process or as components of an apparatus for example. As illustrated, method 300 begins with module 310 in which existing wizard data is selected for inclusion in the metawizard. At module 320, control logic for use with the selected wizard data is programmed or formed, allowing for activation of portions of the chosen wizards and maintenance of state and environment for example. In some instances, iteration between modules 310 and 320 may occur. At module 330, the assembled metawizard is packaged (such as by packaging as a separate object for example). This packaging may allow for interface between the metawizard and either a wizard renderer or an application for example.

Figure 4:
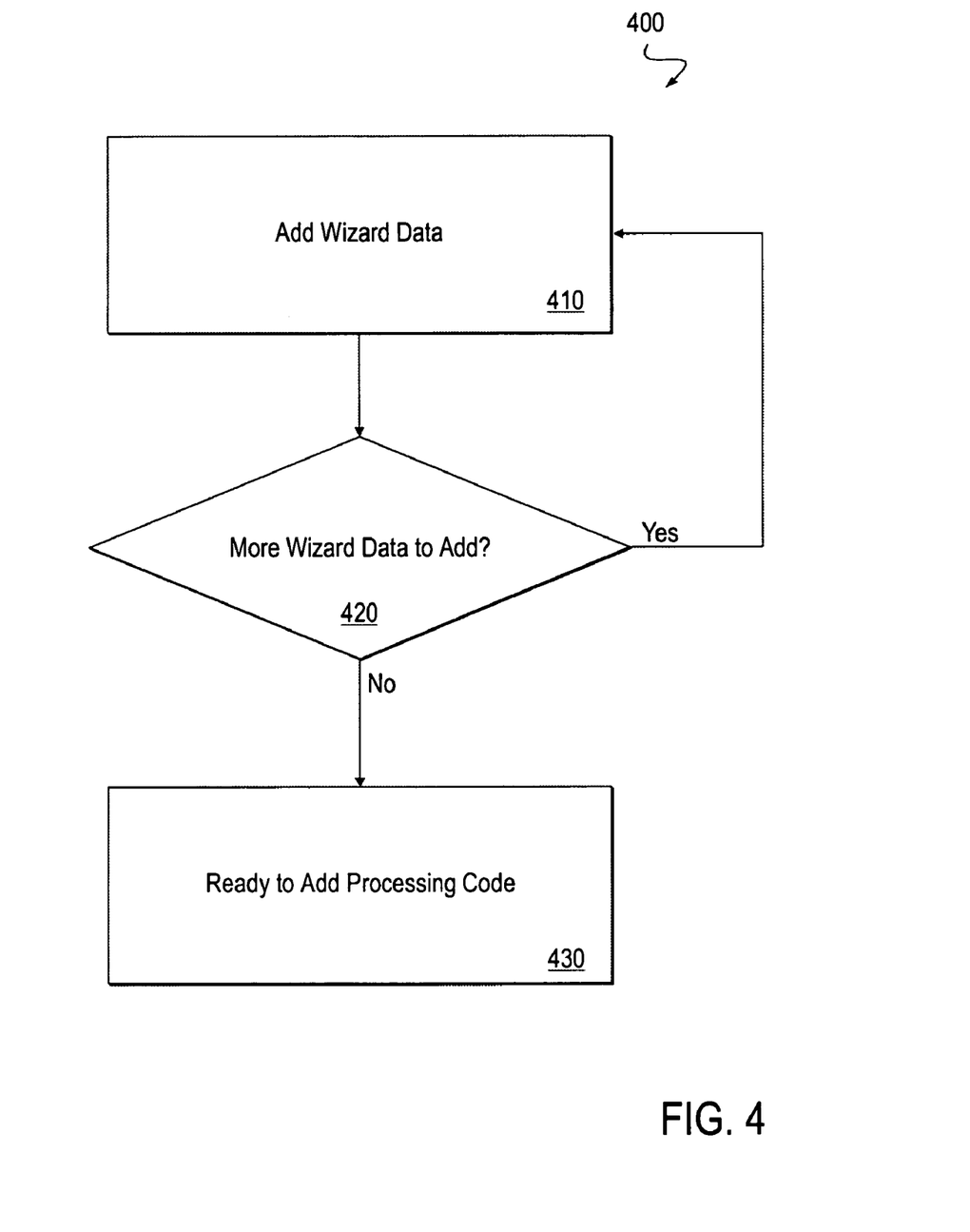
FIG. 4 illustrates an embodiment of a method of adding wizard data to a metawizard.

When adding wizard data to a metawizard, a variety of methods may be employed. FIG. 4 illustrates an embodiment of a method of adding wizard data to a metawizard. Method 400 includes adding a wizard data module, determining whether to add more wizard data, and providing the package of wizard data for processing code. At module 410, a wizard data module is added, such as through addition of an instance, a copy, or a link to a first wizard data module. At module 420, a determination is made as to whether more wizard data needs to be added. If so, the method returns to module 410 for additional wizard data. If not, at module 430, the wizard data module(s) are ready for addition of processing or control code (control logic for example). This may include determining which steps are present and what data structures are used in included wizard data modules by simulating processing of the wizard data for example.

Figure 5:
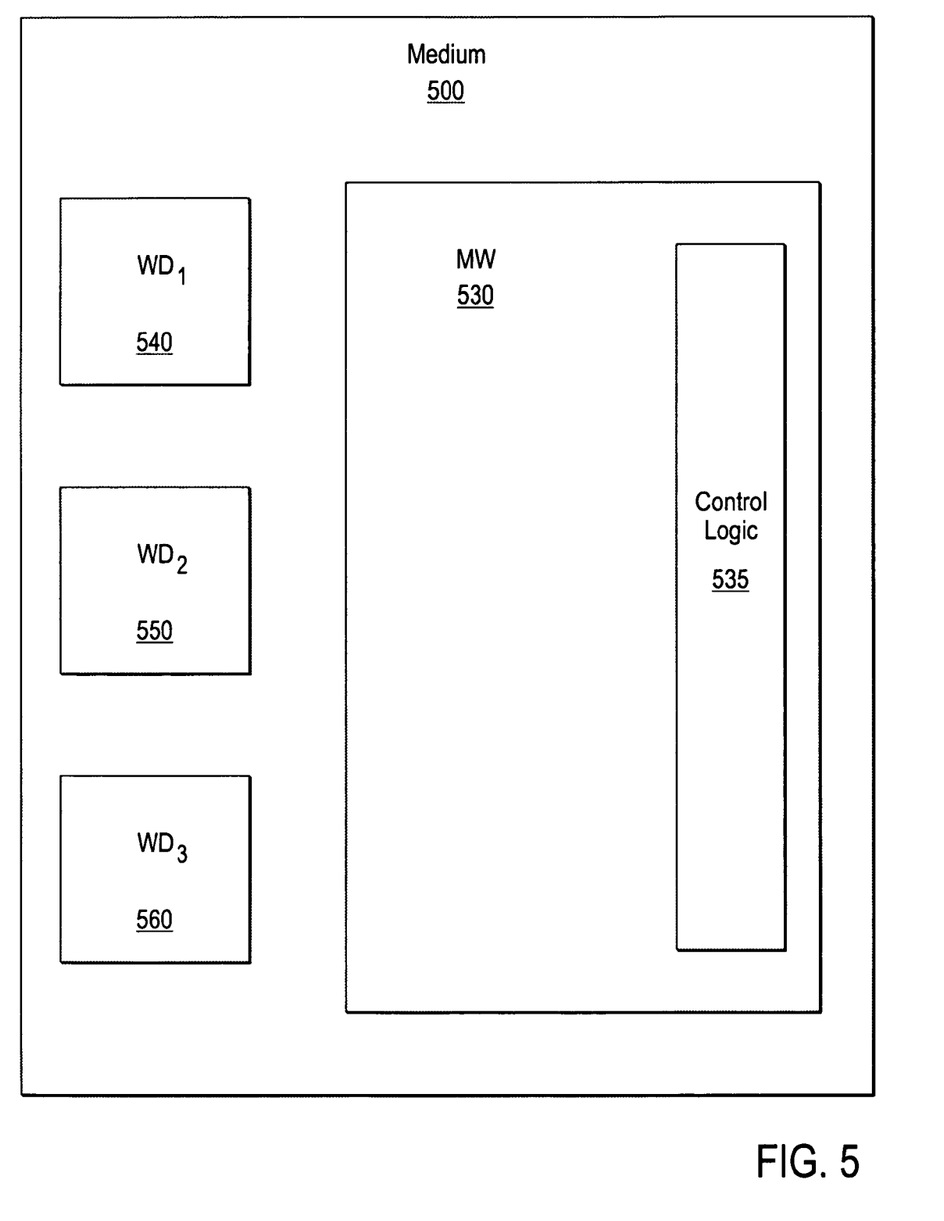
FIG. 5 illustrates an embodiment of a medium which may embody a metawizard.

Methods may be embodied in media (or a medium) as a set of instructions which may cause a processor to perform the method. FIG. 5 illustrates an embodiment of a medium which may embody a metawizard. Medium 500 may be a single medium, a set of media of a single type, or of multiple media. Included (embodied) in medium 500 is a metawizard 530 which has internal control logic 535. First wizard data 540, second wizard data 550 and third wizard data 560 are also embodied in medium 500. Thus, metawizard 530 may include links or pointers to one or more of the wizard data modules (540, 550, and 560) in one embodiment. In another embodiment, metawizard 530 may include instances of one or more of wizard data modules 540, 550 and 560. Examples of types of media may be found in the discussion of FIGS. 7 and 8 below.

Figure 6A:
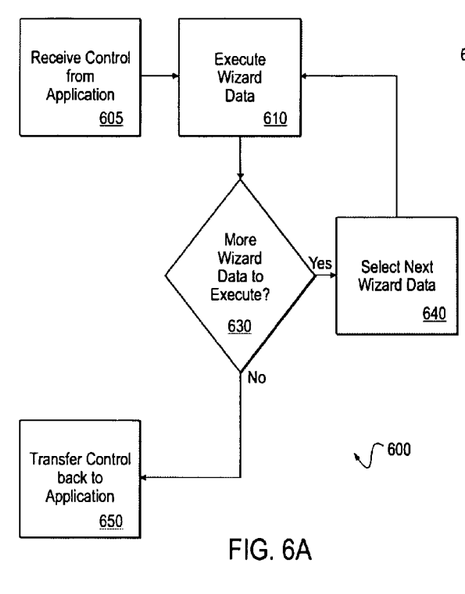
FIG. 6A illustrates an embodiment of a method of operating a metawizard.

Once created, a metawizard from method 300 or embodied in medium 500 may then be operated. FIG. 6A illustrates an embodiment of a method of operating a metawizard. Method 600 includes receiving control from an application, executing wizards, determining if more wizards need to be executed and returning control to the application. In one embodiment, control from an application is received at module 605, such as through a wizard renderer for example.

At module 610, wizard data is executed or operated, such as by operating a step or series of steps from a first wizard data for example. At module 630, a determination is made as to whether additional wizard data needs to be executed. If so, at module 640, the next wizard data to be executed is selected (such as from an ordered list of wizard data to operate for example). Then, at module 610, the next wizard data is executed. If no additional wizard data is to be executed, the process then transfers control back to the application, possibly with some cleanup operations for data structures or data transfer for example.

Figure 6B:
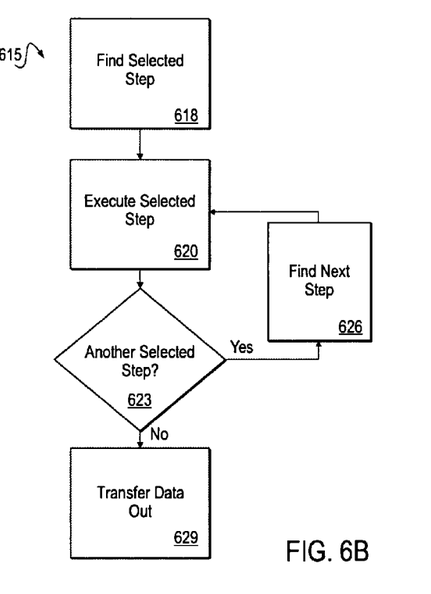
FIG. 6B illustrates an embodiment of a method of operating a wizard within a metawizard.

As wizard data may be executed, so may wizard data steps, either as part of executing wizard data or as the constituent part of an actual metawizard. FIG. 6B illustrates an embodiment of a method of operating a wizard within a metawizard. In one embodiment, method 615 implements the process of module 610. Method 615 includes finding a selected or next step, executing that step, determining if steps remain, and transferring data out.

At module 618, a first step of a wizard data is selected or found from an ordered list for example. At module 620, the selected step is executed. At module 623, a determination is made as to whether there is a next step to execute. In some embodiments, this relates to a next step within a wizard data. In alternate embodiments, this relates to a next step in any wizard data, whether the present wizard data or a separate wizard data. If a next step is present, that next step is found at module 626, and the next step is executed at module 620. If no next step is necessary, the process goes to module 629, where data may be transferred out or reformatted, for example. Thus, method 615 may be used to execute selected steps (or all steps) of a wizard data as part of a metawizard, such as in conjunction with control logic of the metawizard. The data may be transferred out as part of a process of moving data into environmental data structures or reformatting for use with a successive wizard data or application for example.

Figure 7:
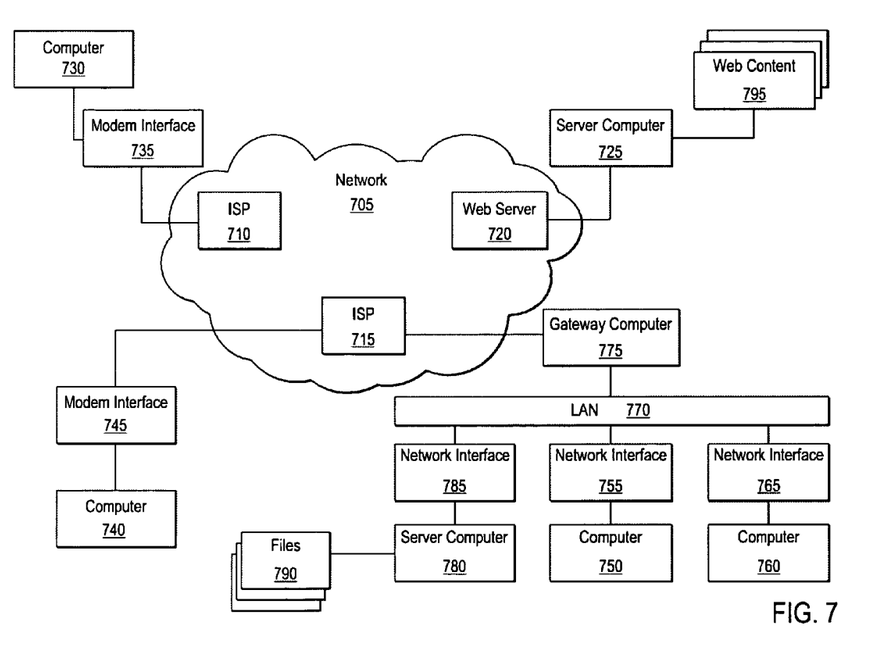
FIG. 7 illustrates an embodiment of a network which may be used in conjunction with a metawizard framework.
Figure 8:
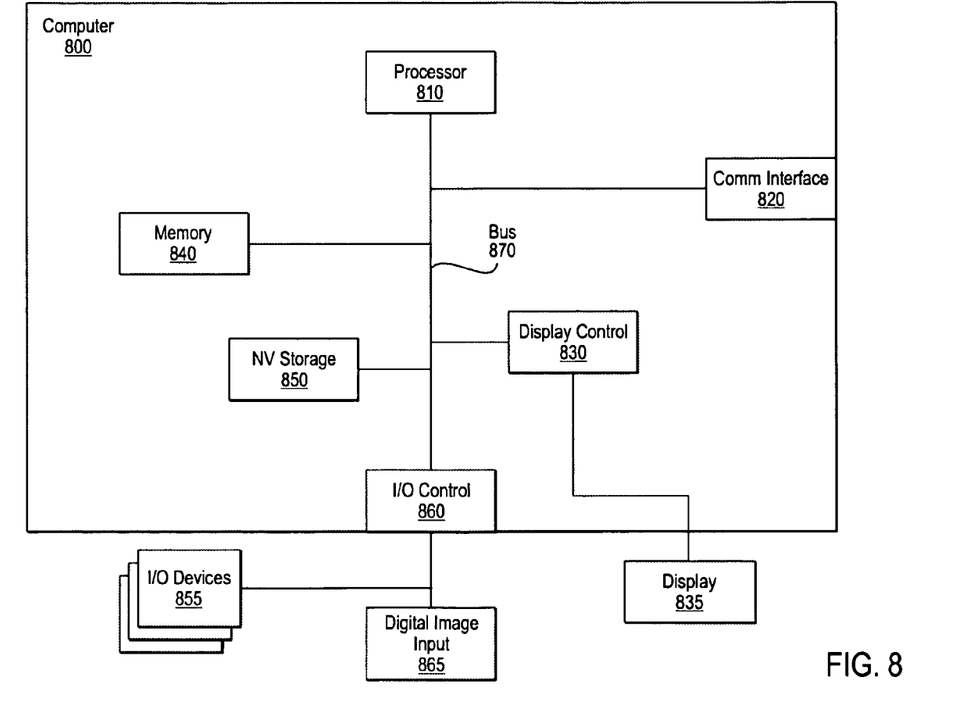
FIG. 8 illustrates an embodiment of a machine which may be used in conjunction with a metawizard framework.

The following description of FIGS. 7-8 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 are coupled to a LAN 770 through network interfaces 755 and 765, which can be Ethernet network or other network interfaces. The LAN 770 is also coupled to a gateway computer system 775 which can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 8 shows one example of a conventional computer system that can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered to be part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can also include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows(r) from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. Moreover, in general, features from one embodiment may be used with other embodiments mentioned in this document provided the features are not somehow mutually exclusive.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

What is claimed is:

1. A method for reusing existing multiple wizard data in a metawizard, wherein the wizard data includes a set of steps and associated information that makes up a wizard, the method comprising:
   receiving requests from an application;
   using control logic to provide an interface with a wizard renderer;
   allowing the wizard renderer to render a wizard by accessing steps and information responsive to the requests;
   executing a portion of a first existing wizard data in the metawizard, executing the first existing wizard data including:
      finding a selected step of the first existing wizard data,
      executing the selected step,
      finding a next selected step of the first existing wizard data,
      executing the next selected step, and
      repeating the finding a next selected step and executing the next selected step until no selected steps of the first existing wizard data remain;
   determining a second existing wizard data in the metawizard remains to be executed;
   executing a portion of the second existing wizard data in the metawizard, executing the second existing wizard data including:
      finding a selected step of the second existing wizard data,
      executing the selected step,
      finding a next selected step of the second existing wizard data,
      executing the next selected step, and
      repeating the finding a next selected step and executing the next selected step until no selected steps of the second existing wizard data remain; and
   combining the selected steps from the first existing wizard data and the selected steps from the second existing wizard data to form a new wizard data, without requiring reprogramming, by producing the metawizard to link the first existing wizard data and the second existing data.

2. The method of claim 1, further comprising:
   determining a third existing wizard data in the metawizard remains to be executed;
   executing a portion of the third existing wizard data in the metawizard, executing the third existing wizard data including:
      finding a selected step of the third existing wizard data,
      executing the selected step,
      finding a next selected step of the third existing wizard data,
      executing the next selected step, and
      repeating the finding a next selected step and executing the next selected step until no selected steps of the third existing wizard data remain; and
   combining the selected steps from the third existing wizard data with the selected steps from the first existing wizard data and the selected steps from the second existing wizard data, without requiring reprogramming, by producing the metawizard to link the first existing wizard data, the second existing wizard data and the third existing wizard data.

3. The method of claim 2, further comprising:
   receiving control from the application; and
   returning control to the application.

4. A computer program product for reusing existing wizard data in a metawizard, wherein the wizard data includes a set of steps and associated information that makes up a wizard, the computer program product being tangibly embodied on a computer-readable medium and including executable code that, when executed, is configured to cause at least one data processing apparatus to execute the metawizard, the metawizard configured to:
   receive requests from an application;
   use control logic to provide an interface with a wizard renderer;
   allow the wizard renderer to render a wizard by accessing steps and information responsive to the requests;
   execute a portion of a first existing wizard data in the metawizard, executing the first existing wizard data including:
      finding a selected step of the first existing wizard data,
      executing the selected step,
      finding a next selected step of the first existing wizard data,
      executing the next selected step, and
      repeating the finding a next selected step and executing the next selected step until no selected steps of the first existing wizard data remain;
   determine a second existing wizard data in the metawizard remains to be executed;
   execute a portion of the second existing wizard data in the metawizard, executing the second existing wizard data including:
      finding a selected step of the second existing wizard data,
      executing the selected step,
      finding a next selected step of the second existing wizard data,
      executing the next selected step, and
      repeating the finding a next selected step and executing the next selected step until no selected steps of the second existing wizard data remain; and
   combine the selected steps from the first existing wizard data and the selected steps from the second existing wizard data to form a new wizard data, without requiring reprogramming, by producing the metawizard to link the first existing wizard data and the second existing data.

5. The computer program product of claim 4, wherein the metawizard is further configured to:
   determine a third existing wizard data in the metawizard remains to be executed;
   execute a portion of the third existing wizard data in the metawizard, executing the third existing wizard data including:
      finding a selected step of the third existing wizard data,
      executing the selected step,
      finding a next selected step of the third existing wizard data,
      executing the next selected step, and
      repeating the finding a next selected step and executing the next selected step until no selected steps of the third existing wizard data remain; and
   combine the selected steps from the third existing wizard data with the selected steps from the first existing wizard data and the selected steps from the second existing wizard data, without requiring reprogramming, by producing the metawizard to link the first existing wizard data, the second existing wizard data and the third existing wizard data.

6. The computer program product of claim 5, wherein the metawizard is furthered configured to:
receive control from the application; and
return control to the application.

7. A system for reusing existing wizard data in a metawizard, wherein the wizard data includes a set of steps and associated information that makes up a wizard, the system comprising:
a processor;
a bus coupled to the processor; and
a memory coupled to the bus;
wherein the processor is configured to:
  receive requests from an application;
  use control logic to provide an interface with a wizard renderer;
  allow the wizard renderer to render a wizard by accessing steps and information responsive to the requests;
  execute a portion of a first existing wizard data in the metawizard, executing the first existing wizard data including:
    finding a selected step of the first existing wizard data,
    executing the selected step,
    finding a next selected step of the first existing wizard data,
    executing the next selected step, and
    repeating the finding a next selected step and executing the next selected step until no selected steps of the first existing wizard data remain;
  determine a second existing wizard data in the metawizard remains to be executed;
  execute a portion of the second existing wizard data in the metawizard, executing the second existing wizard data including:
    finding a selected step of the second existing wizard data,
    executing the selected step,
    finding a next selected step of the second existing wizard data,
    executing the next selected step, and
    repeating the finding a next selected step and executing the next selected step until no selected steps of the second existing wizard data remain; and
  combine the selected steps from the first existing wizard data and the selected steps from the second existing wizard data to form a new wizard data, without requiring reprogramming, by producing the metawizard to link the first existing wizard data and the second existing data.

8. The system of claim 7, wherein the processor is further configured to:
determine a third existing wizard data in the metawizard remains to be executed;
execute a portion of the third existing wizard data in the metawizard, executing the third existing wizard data including:
  finding a selected step of the third existing wizard data,
  executing the selected step,
  finding a next selected step of the third existing wizard data,
  executing the next selected step, and
  repeating the finding a next selected step and executing the next selected step until no selected steps of the third existing wizard data remain; and
combine the selected steps from the third existing wizard data with the selected steps from the first existing wizard data and the selected steps from the second existing wizard data, without requiring reprogramming, by producing the metawizard to link the first existing wizard data, the second existing wizard data and the third existing wizard data.

9. The system of claim 8, wherein the processor is furthered configured to:
receive control from the application; and
return control to the application.

10. An apparatus for reusing existing wizard data in a metawizard, wherein the wizard data includes a set of steps and associated information that makes up a wizard, the apparatus being tangibly embodied on a computer-readable medium and comprising:
means for receiving requests from an application;
means for using control logic to provide an interface with a wizard renderer;
means for allowing the wizard renderer to render a wizard by accessing steps and information responsive to the requests;
means for executing a portion of a first existing wizard data in the metawizard, the means for executing the first existing wizard data including:
  means for finding a selected step of the first existing wizard data,
  means for executing the selected step,
  means for finding a next selected step of the first existing wizard data,
  means for executing the next selected step, and
  means for repeating the finding a next selected step and executing the next selected step until no selected steps of the first existing wizard data remain;
means for determining a second existing wizard data in the metawizard remains to be executed;
means for executing a portion of the second existing wizard data in the metawizard, the means for executing the second existing wizard data including:
  means for finding a selected step of the second existing wizard data,
  means for executing the selected step,
  means for finding a next selected step of the second existing wizard data,
  means for executing the next selected step, and
  means for repeating the finding a next selected step and executing the next selected step until no selected steps of the second existing wizard data remain; and
means for combining the selected steps from the first existing wizard data and the selected steps from the second existing wizard data to form a new wizard data, without requiring reprogramming, by producing the metawizard to link the first existing wizard data and the second existing data.

11. The apparatus of claim 10, further comprising:
means for determining a third existing wizard data in the metawizard remains to be executed;
means for executing a portion of the third existing wizard data in the metawizard, the means for executing the third existing wizard data including:
  means for finding a selected step of the third existing wizard data,
  means for executing the selected step, finding a next selected step of the third existing wizard data, means for executing the next selected step, and means for repeating the finding a next selected step and executing the next selected step until no selected steps of the third existing wizard data remain; and means for combining the selected steps from the third existing wizard data with the selected steps from the first existing wizard data and the selected steps from the second existing wizard data, without requiring reprogramming, by producing the metawizard to link the first existing wizard data, the second existing wizard data and the third existing wizard data.

12. The apparatus of claim 11, further comprising:

means for receiving control from the application; and means for returning control to the application.

\* \* \* \* \*